United States Patent [19]
Gloor et al.

[11] Patent Number: 6,094,830
[45] Date of Patent: *Aug. 1, 2000

[54] INCLINATION-COMPENSATING DISPLAY DEVICE FOR A COMPASS

[76] Inventors: Hans Gloor, Schollstrasse 39, CH-2504 Bienne; Denis Gigon, Rue Centrale 66, CH-2502 Bienne, both of Switzerland

[ * ] Notice: This patent is subject to a terminal disclaimer.

[21] Appl. No.: 08/952,965

[22] PCT Filed: Jun. 5, 1996

[86] PCT No.: PCT/EP96/02467

§ 371 Date: Dec. 5, 1997

§ 102(e) Date: Dec. 5, 1997

[87] PCT Pub. No.: WO96/41128

PCT Pub. Date: Dec. 19, 1996

[30] Foreign Application Priority Data

Jun. 7, 1995 [CH] Switzerland ........................... 1661/195
Aug. 16, 1995 [DE] Germany ........................... 195 29 976

[51] Int. Cl.[7] .................................................. G01C 17/04
[52] U.S. Cl. ........................... 33/364; 33/352; 33/355 R; 33/272
[58] Field of Search ...................... 33/364, 352, 355 R, 33/356, 355 D, 272

[56] References Cited

U.S. PATENT DOCUMENTS

| | | | |
|---|---|---|---|
| 1,799,648 | 1/1931 | Salzgeber | 33/364 |
| 2,019,411 | 10/1935 | Hassel | 33/364 |
| 2,446,258 | 8/1948 | Burt | 33/355 R |
| 3,568,329 | 3/1971 | Campbell | 33/364 |
| 4,236,316 | 12/1980 | Suzuki | 33/364 |
| 4,700,490 | 10/1987 | Kramer et al. | |
| 4,930,224 | 6/1990 | LeBlanc | 33/364 |
| 5,079,845 | 1/1992 | Childers | 33/364 |
| 5,233,759 | 8/1993 | Gloor et al. | 33/355 R |

FOREIGN PATENT DOCUMENTS

| | | | |
|---|---|---|---|
| 127623 | 3/1950 | Sweden . | |
| 2 025 616 | 1/1980 | United Kingdom | 33/364 |

*Primary Examiner*—Andrew H. Hirshfeld

[57] ABSTRACT

The present invention provides a compass comprising an at-least-partially-transparent housing having a top and a bottom, a vertically orientated, conical pivot bearing, and a magnetic detection means which is mounted on the vertically-oriented conical pivot bearing. The magnetic detection means thereby is capable of rotating in a substantially-horizontal plane. The magnetic field detection means is provided with a radially-extending, tilt-compensating, indicator device. The indicator device has at least one spacer element which is spaced from the magnetic field detection means, the spacer element projecting from the indicator device and being directed towards one of a top of the housing of the compass and a bottom of the housing of the compass. By this structure, the indicator device is guidable in the housing of the compass substantially-parallel to at least one of the top of the housing of the compass and the bottom of the housing of the compass by being mechanically pushed off at least from one of the top of the housing of the compass and the bottom of the housing of the compass by the spacer element when the housing is tilted. In addition, the spacer element which is arranged on the indicator device is oriented in respect to the top of the housing of the compass or the bottom of the housing of the compass in such a manner that an abutting of the indicator device against the housing of the compass can be prevented.

12 Claims, 2 Drawing Sheets

INCLINATION-COMPENSATING DISPLAY DEVICE FOR A COMPASS

BACKGROUND OF THE INVENTION

1. Field of the Invention

The invention relates to a tilt-compensating indicator device for a compass having a magnetic field detection means which is mounted on a conical pivot bearing, the magnetic field detection means being capable of rotating in an essentially horizontal plane when the conical pivot bearing is vertically orientated, which is located in a housing of the compass, comprising a bottom and a top.

2. Description of the Prior Art

A tilt-compensating indicator device of this type is known from Swiss Patent No. 683,373 which is owned by the applicant. This commercially marketed tilt-compensating indicator device, which has proved its usefulness in practice, is separately mounted from the magnetic field detector and is connected with it by means of a dog. This avoids the disadvantages which occurr in a customary mechanical compass in which the indicator device is rigidly and directly connected to, or is identical with the magnetic field detector, namely that when the compass is tilted at a relatively small angle (8°–12°) an indicator needle or an indicator disc in the indicator device comes into contact with the top or the bottom of the housing. This disturbing effect can also occur due to different inclinations in the magnetic field of the earth when the compass is used at different latitudes.

As a result, the compass is no longer able to function properly. Before it is read, it must therefore be brought into a position where the indicator device can once more swing freely. But in many applications, e.g., orienteering, it is extremely important that the display can be accurately read as quickly as possible, i.e. without being delayed by having to re-orient the compass. In addition, tilting of the compass can disadvantageously result in bearing errors.

The known type of tilt-compensating indicator device for a compass is capable of eliminating or at least reducing the above-mentioned undesirable effects. However, it possesses the disadvantage that the bearing of the indicator device is costly to construct, and in addition the bearing must be accurately aligned in an axial direction. The axial alignment of the bearing of the indicator device with the bearing of the magnetic field detector is labor intensive.

The compass which is described in U.S. Pat. No. 2,446,258 is designed in particular for aircraft. It possesses a compass housing in which an indicator device rotates around an axis which is fixed vertically in the housing, in a plane perpendicular to this vertical axis. A frame running parallel to the vertical axis is firmly connected to the indicator device. A magnetic needle acting as a magnetic field detector which rotates via bearing elements around a horizontal axis defined by these bearing elements is mounted in this frame. The mounting of the magnetic needle in the frame ensures that the needle remains parallel to the magnetic field of the earth.

From Swedish Patent No. 127,623 there is known a liquid-filled compass having a compass needle with two floating bodies being arranged at its underside. These two floating bodies serve for keeping the needle in a horizontal position in non-horizontal earth magnetic fields by their buoyancy. Because of this, a parallel guidance of the needle in respect to a bottom and/or a top of the housing is prevented when the housing is tilted.

SUMMARY OF THE INVENTION

(a) Aims of the Invention

It is therefore one object of the invention further to refine a tilt-compensating indicator device of the type mentioned at the beginning in such a way that, even if the compass housing is tilted at a larger angle, and given different inclinations of the earth's magnetic field, it guarantees an adequately good reading; at the same time, however, the tilt-compensating indicator device according to the invention should be particularly simple in structure.

(b) Statement of Invention

This object is achieved according to the invention in that at least one spacer element is arranged on the indicator device and/or in the housing of the compass, by which the indicator device is guideable in the housing of the compass essentially parallel to the top and/or the bottom of the housing.

The present invention therefore provides a compass comprising an at-least-partially-transparent housing having a top and a bottom, a vertically oriented, conical pivot bearing, and a magnetic detection means which is mounted on the vertically-oriented conical pivot bearing. The magnetic detection means thereby is capable of rotating in a substantially horizontal plane. The magnetic field detection means bears an indicator device. The indicator device has at least one spacer element, the spacer element projecting from the indicator device, and being spaced from the magnetic field detection means and being directed towards one of a top of the housing of the compass and a bottom of the housing of the compass. By this structure, the indicator device is guidable in the housing of the compass substantially-parallel to at least one of the top of the housing of the compass and the bottom of the housing of the compass by being mechanically pushed off from at least one of the top of the housing of the compass and the bottom of the housing of the compass by the spacer element when the housing of the compass is tilted. In addition, the spacer element, which is arranged on the indicator device, is oriented in respect to the top of the housing of the compass or the bottom of the housing of the compass in such a manner that an abutting of the indicator device against the housing of the compass can be prevented.

(c) Other Features of the Invention

By a first principal feature of this invention, the indicator device includes two spacer elements.

By one feature of this first principal feature of this invention, the indicator device has one of the spacer elements arranged at each side of a centre point of the indicator device and the spacer element points towards at least one of the top of the housing of the compass and the bottom of the housing of the compass.

By a second feature of this first principal feature of this invention, at least one of the spacer elements is upwardly projecting towards the top of the housing of the compass.

By a third feature of this first principal feature of this invention, the indicator device has two spacer elements which are arranged symmetrically relative to a centre point of the tilt-compensating indicator device.

By a fourth feature of this first principal feature of this invention, at least one of the spacer elements is provided with a pointed tip.

By a fifth feature of this first principal feature of this invention, the indicator device has a non-rigid connection with the magnetic field detection means.

By a sixth feature of this first principal feature of this invention, the indicator device is pivotably-moveably-mounted on the magnetic field detection means via a bearing element.

By a first subsidiary feature of this sixth feature of this first principal feature of this invention, the bearing element of the indicator device interacts with bearing elements of the magnetic field detection means, and is oriented substantially-orthogonal to the North-South direction of the magnetic field detections means.

By a second subsidiary feature of this sixth feature of this first principal feature of this invention, the magnetic field detection means possesses a magnetic carrier, and means are provided in the magnetic carrier to enable the magnetic field detection means to receive the bearing element of the indicator device.

By a third subsidiary feature of this sixth feature of this first principal feature of this invention, the bearing element of the indicator device is formed either as a bearing axis or a tilting bearing.

By a seventh feature of this first principal feature of this invention, the indicator device possesses two diametrically-opposed pointers which are connected with the bearing axis.

By an eighth feature of this first principal feature of this invention, pointers of the indicator device are connected with the bearing element of the indicator device via annular connecting elements.

(d) Generalized Features of the Invention

By means of the invention, a tilt-compensating indicator device for a compass is created in a particularly advantageous way. The indicator device is in an unstable equilibrium and can rotate around the bearing axis in a plane which is orthogonal to the West-East direction of the magnetic field detection means. As a result of this rotatibility of the indicator device as provided by the invention, if either the magnetic field detection means or the housing of the compass tilt in the North-South direction, the indicator device does not follow the corresponding movement but instead substantially retains its position, so that advantageously the indicator device according to the invention is prevented from coming into contact with the top or bottom of the compass housing. Since the indicator device does not execute any movement around the compass axis when the compass housing is tilted in the East-West direction, it is not necessary to decouple the indicator device from the tilt motion of the magnetic field detection means. Thus, in a particularly simple manner, the features according to this invention permit the trouble-free operation of a compass equipped with the tilt-compensating indicator device according to this invention over this entire angular range.

According to a further advantageous refinement of the invention, the indicator elements of the indicator device are connected with the bearing axis via annular connecting elements which are designed in such a way that when the permanent magnet system of the magnetic field detection system tilts, this system can pass through a space bounded by the bearing pin and the annular connecting elements. Such a feature has the advantage that, even if the space between the magnetic field detection system and the indicator device is very small, the movement of the latter cannot be hampered by the permanent magnet system of the magnetic field detector.

According to a further advantageous refinement of the invention, the indicator device has the form of an indicator disc which, in an outward direction, is slightly bent towards the bottom of the housing, at least in the East-West orientation of the permanent magnet system and preferably also in the North-South orientation. The advantage of such feature is that it permits greater tilting of the indicator disc relative to the housing without the indicator disc coming into contact with the top or bottom of the housing.

BRIEF DESCRIPTION OF THE DRAWINGS

In the accompanying drawings.

DESCRIPTION OF PREFERRED EMBODIMENT

Figure 1:
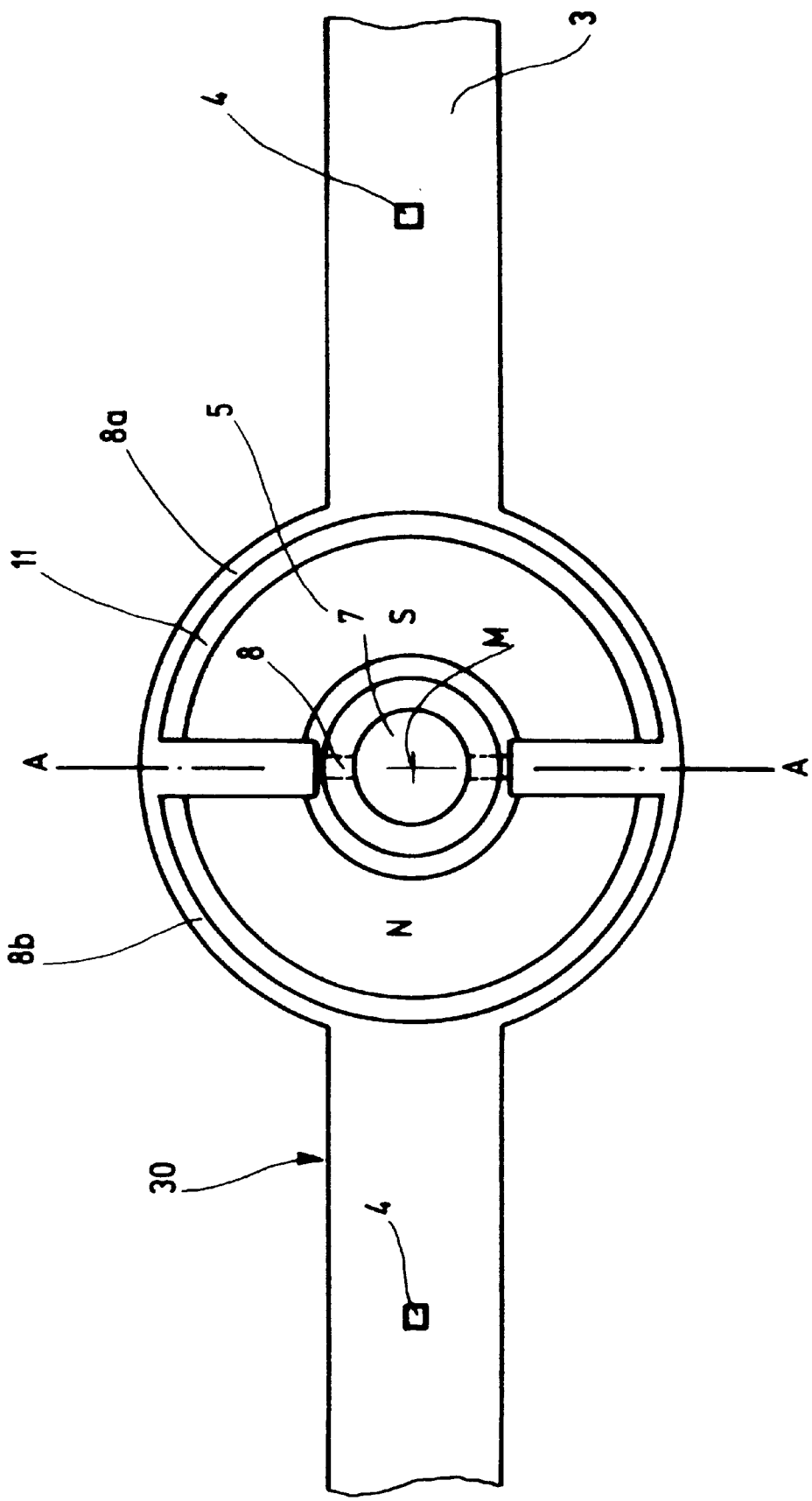
FIG. 1 is a top view of an embodiment of an indicator device according to this invention.
Figure 2:
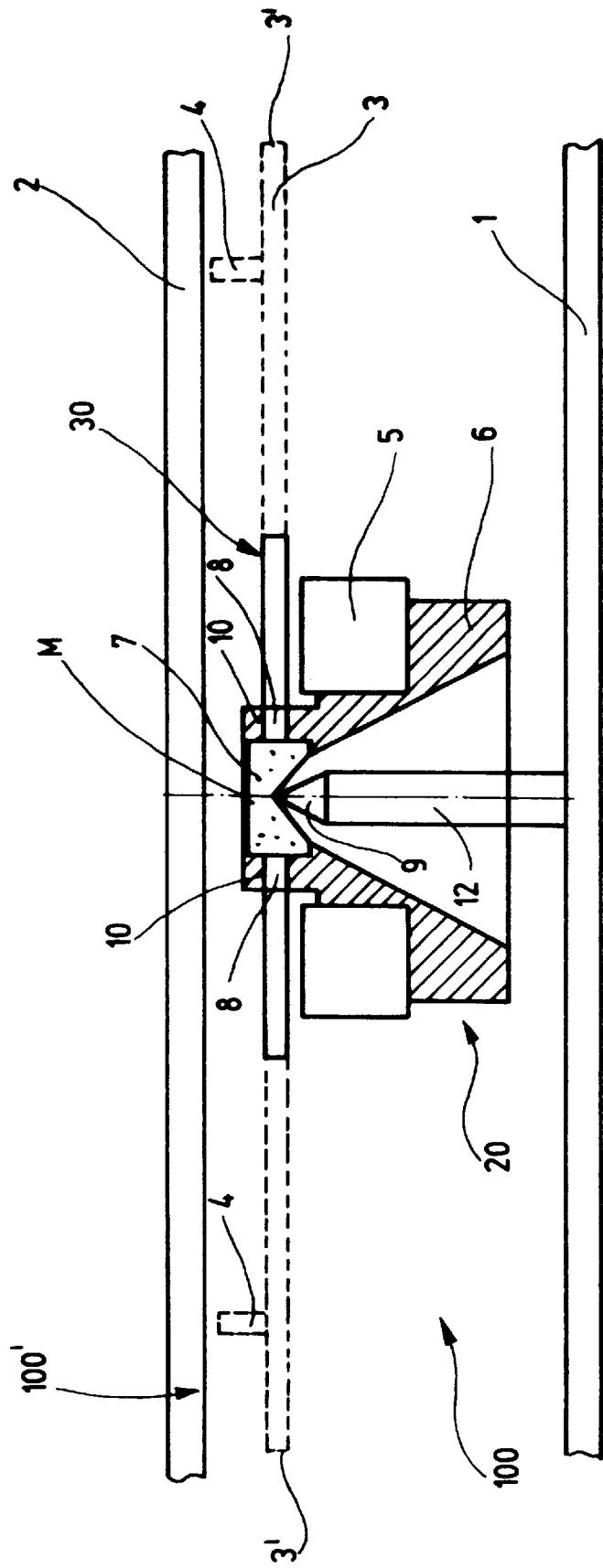
FIG. 2 is a section through a compass using the indicator device shown in FIG. 1, corresponding to a cross section along the line A—A in FIG. 1.

Description of FIG. 1 and FIG. 2

The embodiment of a tilt-compensated indicator device 30 for a compass 100, as depicted in FIGS. 1 and 2, is mounted in a compass housing 100' of which only a transparent top 2 and a preferably likewise transparent bottom 1 are illustrated in FIG. 2. The compass housing 100', which is bounded by the bottom 1 and the top 2, contains preferably a fluid as a gas which serves mainly to damp the movement of the indicator system 30. A magnetic field detection means, indicated generally by the reference number 20, is mounted via a pivot bearing 7 located on the tip 9 of a shaft 12 which is attached to the bottom 1. Such magnetic field detection means is attached to the pivot bearing 7 which is located on the tip 9 of the shaft 12, the bearing being manufactured preferably from a synthetic ruby, a magnet carrier 6 which is firmly connected to the pivot bearing 7, and a permanent magnet 5 having a preferably cylindrical shape. The pivot bearing 7, together with the tip 9 of the shaft 12, forms a compass bearing exhibiting very low friction and permitting the magnet carrier 6 to move through a large range of travel without coming into contact with any other part of the compass 100.

To prevent any tilt motion of the magnetic field detection means 20 in the North-South direction from being transferred to the indicator device 30, two holes 10 acting as bearing elements are provided in the magnetic carrier 6, approximately in the plane of the point of rotation of the pivot bearing 7 around the tip 9. A bearing axis 8 of the indicator device 30 is rotatably mounted in the holes, in the form of a bearing element. The bearing axis 8 is arranged substantially perpendicular to the North-South direction of the magnetic field detection means 20. The bearing axis 8 of the indicator device 30 is formed either as a continuous axis or as two separate radial pins. It is connected via annular connecting elements 8a, 8b with two pointers 3 which perform the actual indicating function of the indicator device 30.

If the compass housing 100' of the compass 100 is tilted in the North-South direction of the magnetic field detection means 20, the permanent magnet 5 orients itself obliquely to the tip 9 of the shaft 12 which is connected to the bottom 1 of the compass housing 100'. Because of the movable mounting of the indicator device 30 in the holes 10 of the magnet carrier 6 of the magnetic field detection means 20, which holes act as bearing mounts, the movements of the magnetic field detection means 20 and of the indicator device 30 are advantageously not forcibly coupled in this case, so that the indicator device does not follow the movement of the magnetic field detection means 20 which is triggered by the tilt of the housing 100' in the North-South direction of the inclination of the earth's magnetic field. Since, as already mentioned at the beginning, no torque acts on the indicator device 30 when the housing tilts in the West-East direction of the magnetic field detection 20, and the indicator device thus continues to point in the North-South direction, it is not absolutely necessary to decouple the two devices 20, 30. As a result, the mounting of the indicator device 30 as described above on the bearing axis 8, which is arranged substantially perpendicular to the North-South direction of the magnetic field detection means 20, guarantees in a particularly simple manner that the indicator device 30 can move substantially freely throughout its full angular range.

It is furthermore advantageous in this connection that, when the magnetic field detection means 20 is tilted, its permanent magnet 5 can pass through the gap which is bounded by the annular connecting elements 8a, 8b and the bearing axis 8, so that advantageously it is possible to provide only a small amount of space between the indicator device 30 and the magnetic field detection means 20. Such an arrangement has the advantage that a compass 100 of this type can be particularly compact in construction, and for that reason it can be advantageously used in a flat compass housing 100'.

If sufficient space is available to construct the compass 100, and it is therefore not necessary for the indicator device 30 and the magnetic field detection means 20 to be arranged close together, it is naturally possible also to design the annular disc which is defined by the annular connecting elements 8a, 8b as a full disc, which is less expensive to produce that the design described above.

To prevent the pointers 3 of the indicator device 30 from coming into contact with the bottom 1 or top 2 of the housing 100' if the housing 100' assumes a large angle of tilt, or if the housing 100' of the compass 100 is of very shallow construction, in an advantageous manner one or more spacer elements 4 on the pointers 3 of the indicator device 30 are provided, said spacer elements having a preferably pointed configuration, as can best be seen from FIG. 2. These spacer elements 4 are arranged preferably symmetrically on the pointers 3, preferably at a distance relative to the mid-point M of the indicator device 30. These spacer elements 4, which are preferably formed by bending them from the material of the pointers 3 after a contour etching or a pressure forming process prevent the tips 3' of the pointers 3 from coming into contact with the top 2 and/or the bottom 1 of the compass housing 100' if the compass housing 100' tilts too much. If this happens, the pointed spacer elements 4 come up against the top 2 and/or the bottom 1 thus limiting the tilt movement of the indicator device 30. Although in this case some friction occurs between the spacer elements 4 and the top 2 and/or the bottom 1, and thus affects the movement of the indicator device 30, this friction is so low that the mobility of the indicator device 30 and thus the indicating accuracy of the compass 100 are not impaired.

In the matter of the above-mentioned embodiment, it should be stated conclusively that it may be advantageous for a series of applications if the pointers 3 in the East-West direction of the magnetic field detection means 20 are slightly bent towards the bottom 1, so that the pointers 3 can assume a larger tilt angle relative to the compass housing 100'.

The embodiment of the indicator device 30 with two pointers 3 as illustrated in FIGS. 1 and 2 is not the only one possible. Instead, a number of different configurations are conceivable for the indicator device 30. For example, is should also be mentioned here that the pointers 3 can be replaced by an indicator disc which is essentially the same size in terms of area as the top 2 of the compass housing 100'. In this case it is advantageous if, in a radially outward direction, the indicator disc is slightly bent towards the bottom in order to permit a greater tilt angle of the indicator disc relative to the compass housing 100'. The spacer elements 4 arranged on the pointers 3 or on the indicator disc of the indicator device 30 can be replaced by circular elevations, which may also be discontinuous, in the top 20 or the bottom 1 of the compass housing 100'.

Strictly speaking, it does not need to be stated that the above-mentioned bearing element, which has the form of a bearing axis 8, of the indicator device 30 may also take the form of a tilting bearing (knife-edge bearing). In this case, a V-shaped mount is used instead of the holes 10.

Finally, it has to be stated that even a part of the top 2 and/or the bottom 1 can function as a spacer element for the indicator device 30. As an example, it has to be mentioned that, the top 2 and/or the bottom 1 have at least in one part a conical shape so that the end regions of the pointers 3 can engage at these conical-shaped parts to prevent an undesirable tilt.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. A compass comprising
an at-least-partially-transparent housing having a top and a bottom;
a vertically-orientated, conical pivot bearing;
a magnetic field detection means which is mounted on said vertically-oriented conical pivot bearing, said magnetic field detection means thereby being capable of rotating in a substantially horizontal plane, said magnetic field detection means bearing an indicator device, said indicator device having at least one spacer element thereon, which is spaced from said magnetic field detection means, said at least one spacer element projecting from said indicator device and being directed towards one of said top of said housing of said compass and said bottom of said housing of said compass,
wherein:
said indicator device is guidable in said housing of said compass substantially-parallel to at least one of said top of said housing of said compass and said bottom of said housing of said compass by being mechanically pushed off from at least one of said top of said housing of said compass and said bottom of said housing of said compass by said spacer element when said housing is tilted; and further
wherein:
said spacer element prevents an abutting of said indicator device against said housing of said compass.

2. The compass according to claim 1, wherein said indicator device includes a second spacer element.

3. The compass according to claim 2, wherein said indicator device has said spacer elements arranged at each side of a centre point of said indicator device, and wherein both said spacer elements point towards at least one of said top of said housing of said compass and said bottom of said housing of said compass.

4. The compass according to claim 2, wherein at least one of the spacer elements is upwardly projecting towards said top of said housing of said compass.

5. The compass according to claim 2, wherein said spacer elements are arranged symmetrically relative to a centre point of said indicator device.

6. The compass according to claim 2, wherein said indicator device has a non-rigid connection with said magnetic field detection means.

7. The compass according to claim 2, wherein said indicator device is pivotably-moveably-mounted on said magnetic field detection means via a bearing element of said indicator device.

8. The compass according to claim 7, wherein said bearing element of said indicator device, interacts with bearing elements of said magnetic field detection means, and is oriented substantially-orthogonal to the North-South direction of the magnetic field detections means.

9. A compass according to claim 7, wherein said magnetic field detection means possesses a magnetic carrier; wherein said bearing elements of said magnetic field detection means are provided in said magnetic carrier; and wherein said magnetic carrier also receives said bearing element of said indicator device.

10. The compass according to claim 7, wherein said bearing element of said indicator device is formed as a bearing axis.

11. The compass according to claim 7, wherein said indicator device possesses two diametrically opposed pointers which are connected with said bearing axis.

12. The compass according to claim 11, wherein said pointers of said indicator device are connected with said bearing element of said indicator device via annular connecting elements.

* * * * *